Aug. 2, 1927.

P. CATUCCI 1,637,334

CLICK CHECK FOR REELS

Original Filed March 21, 1925

INVENTOR
Pliny Catucci
BY
Frak C Fischer
ATTORNEY

Patented Aug. 2, 1927.

1,637,334

UNITED STATES PATENT OFFICE.

PLINY CATUCCI, OF NEWARK, NEW JERSEY.

CLICK CHECK FOR REELS.

Original application filed March 21, 1925, Serial No. 17,420. Divided and this application filed January 28, 1927. Serial No. 164,197.

This invention relates in general to fishing reels and more particularly to adjustable click checking mechanisms as used in connection with certain types of reels, and is a division of my application for fishing reels, filed March 21, 1925, Serial Number 17,420, and issued on December 28, 1926, Patent Number 1,612,177.

One feature of the invention resides in an adjustable click mechanism in which the click actuating springs are provided with adjustable tensioning means.

Another advantage is in the provision of a click presenting three uniform work faces, any of which can be moved into operative position thus increasing the period of its operative existence three fold, and to provide a replaceable click wheel, a duplicate of which can be readily substituted when required.

A further object is to provide a simple, compact and effective device for the mentioned purpose, inexpensive to manufacture and easy to apply.

These objects are accomplished by the novel design, construction and arrangement of elements hereinafter described and shown in the accompanying drawing, forming part of this disclosure, and in which:—

Figure 1:
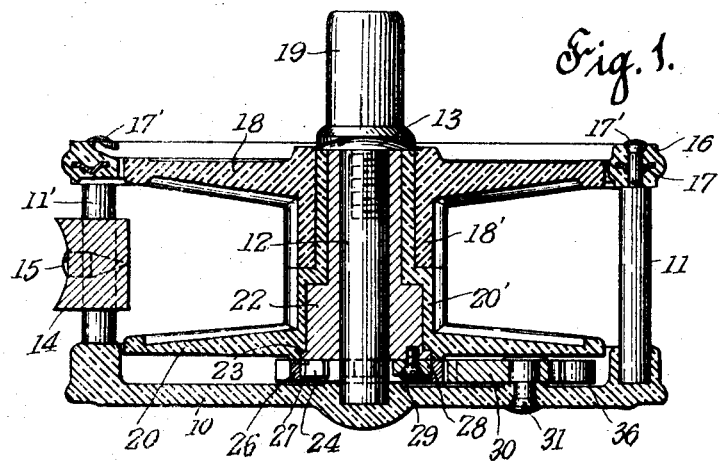
Figure 1 is a transverse sectional view of an embodiment of the device, the section being taken substantially on line 1—1 of Figure 2, but showing a complete assembly.

The reel frame is composed of circular back plate 10 having a series of raised lugs on its inner side into which are rigidly moulded metal frame posts 11, the plate being formed of a plastic self-hardening composition by die casting or moulding processes.

A metal spindle 12 is similarly mounted at the center of the plate, its outer end being drilled and tapped to receive a broad headed screw 13 to hold the spool in place when assembled.

At one side of the frame are two adjacently spaced posts 11' to which is secured a foot plate 14 engageable with a support, as a fishing pole, and held rigidly by conically pointed screws 15 the same entering the posts in a secure manner.

The outer ends of the several posts are fixed to a ring 16 having an embedded reenforcement 17 by means of screws 17' and rotatable within the confines of the ring is the outer flange 18 of the reel spool, the same being provided with a winding crank knob 19 fixed near its peripheral edge.

The inner flange 20 of the spool has a hub 20' shouldered and reduced to engage in the corresponding hub 18' of the outer flange, but continuing through to the outer face of the flange 18, both hubs being held in proper position by the cap screw 13.

Within the stepped inner hub 20' is a metal sleeve 22 reduced at its upper end in conformity with the reduced portion of the hub and extending to the screw 13.

The bore of the sleeve 22 is such as to freely rotate on the spindle 12 and at its inner end portion is a stepped enlargement 23 set in a corresponding annular recess in the flange 20.

The continuing end of the sleeve has formed on it a series of equally spaced projections 24, six being shown, the same having a recess 25 in the circumferential portions of the segments thus formed.

A ring 26 having peripheral gear teeth is disposed between the inner end of the sleeve 22 and back plate 10, this ring, or click wheel having inreaching narrow segmental flanges 27 arranged in number and position to admit the sleeve projections 24 to pass through between the flanges and by imparting a slight relative turning movement, the flanges 27 may become engaged in the recesses 25 of the sleeve which thereby becomes locked to the toothed ring but is readily detachable.

Figure 3:
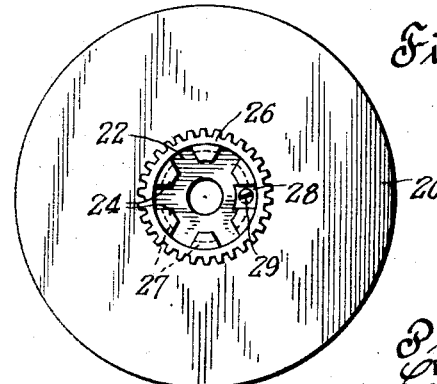
Figure 3 is a bottom plan view of the lower flange of the spool and click wheel ring detachably carried thereby.

In order to positively secure the click wheel from turning relative to the sleeve 22, a key 28 may be inserted in one of the grooves between the projections 24 and held by a screw 29 as best seen in Figure 3, such key being removable when an unworn click wheel is to be substituted.

The reason for making the ring or click wheel 26 detachable is that in practice the click wheel teeth wear to the extent of requiring replacement and the means described render such replacement readily and quickly performed.

The click pawl in the present case is what is known as the fixed type; that is, it is always ready to operate. It consists of a triangular plate 30 held by a pivot 31 to the back plate 10.

On the back plate, located on opposite sides of the spool spindle 12, are two series of guide studs 32 and 33 to act as guides for the body portions 34 and 35 of click springs 36 and 37, having arcuately bent ends to bear against the outer flat edge of the click pawl 30 as presented to them.

Figure 2:
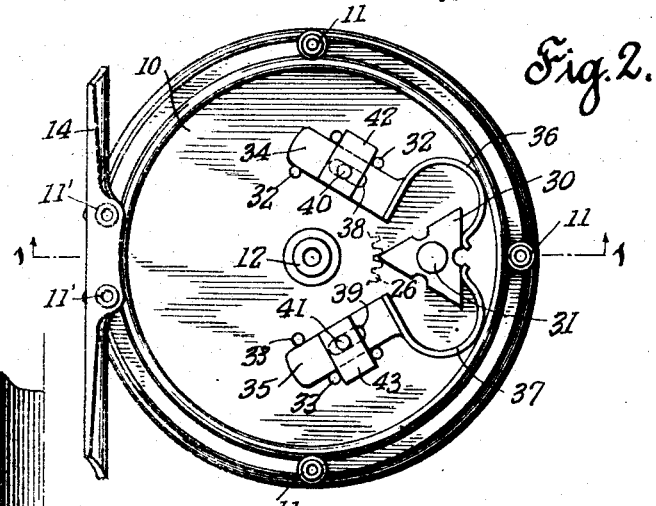
Figure 2 is a plan view of the reel frame with the spool and head ring omitted to show the means for adjusting the click springs.
Figure 4:
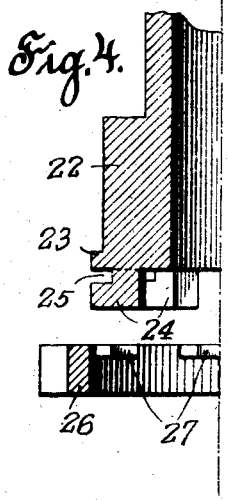
Figure 4 is a greatly enlarged fragmentary sectional view of the sleeve bearing and click wheel ring as disengaged.

The bodies of the springs contain slots 38 and 39 to receive screws 40 and 41 entered from the back side of the back plate and screwed into clamping nuts 42 and 43 as shown in Figure 2.

By this means the springs 36 and 37 may be individually adjusted back and forth to the limit of the slots in their bodies and fixed in such adjustment by the clamp screws, thus permitting the springs to operate by giving properly adjusted pressure on the outer edge of the click pawl.

The triangular form of the click pawl enables changing the position of the pawl to bring any of its angular points towards the center to engage the click wheel 26, thus providing for wear as the reel is used.

As changes of construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:—

1. A click mechanism for fishing reels, comprising in combination with the back plate of a reel frame, a triangular click pawl pivotally mounted on said plate, a pair of mating springs each bearing upon one and the same edge of said pawl, and means for adjustably securing said springs on said plate whereby their pressure upon said pawl may be separately regulated.

2. A click mechanism for fishing reels, comprising in combination with the back plate of a reel frame, a triangular click pawl pivotally mounted on said plate, said pawl presenting three straight edges any two of which converge to a sharp point, a pair of opposed bowed springs having slotted body portions, guides for the spring bodies on said plate, screws in said plate to pass through the slots in said bodies, and clamp nuts for the screws whereby said spring bodies may be individually held in adjustment, the bowed portion of said springs impinging on one of the straight edges of said pawl.

3. A click mechanism for fishing reels, comprising in combination with the back plate of a reel frame having a spool rotatably mounted therein, a toothed click wheel detachably engaged on said spool, an equilateral triangular click pawl pivoted on said plate in position to cause engagement of one of its points with the teeth of said wheel, a pair of opposed arcuate adjustable springs carried by said plate to press against the straight edge of said pawl opposite the point engaged in said wheel, and means on said plate to clamp each spring independently when in adjustment.

4. A click mechanism for fishing reels, comprising in combination with a sleeved spool bearing having a series of castellated projections at its inner end and a circumferential groove at the base of said projections, a click wheel having external teeth and a series of internal projections adapted to enter the spaces between the castellated projections and engage in the circumferential groove upon relative rotation, and means to lock said click wheel to the spool bearing against rotation after assemblage.

5. A click mechanism for fishing reels, comprising in combination with a sleeved spool bearing having a series of castellated projections at its inner end and a circumferential groove at the base of said projections, a click wheel having external teeth, a series of internal projections on said click wheel to enter the spaces between the castellated projections of the spool bearing, said click wheel projections being engageable in the mentioned groove of the spool bearing upon relative rotary movement, and a locking key to enter a space between said projections to lock the click wheel to the spool bearing.

6. A click mechanism for fishing reels, comprising in combination with the back plate of a reel frame, a triangular click pawl pivotally mounted on said plate, a sleeved spool bearing having a series of projections at its base, a toothed click wheel having means for engagement with said projections, means for positively locking said wheel and spool bearing as a unit, one of the points of said pawl engaging the teeth of said wheel, and a pair of independently adjustable springs carried by said plate to impinge on the same edge of said pawl whereby the pawl may produce a greater or lesser braking effect on said wheel and sleeved spool.

This specification signed and witnessed this 26th day of January, 1927.

PLINY CATUCCI.